United States Patent
Coan et al.

(10) Patent No.: US 7,662,333 B2
(45) Date of Patent: Feb. 16, 2010

(54) VACUUM-ASSISTED POTTING OF FIBER MODULE TUBESHEETS

(75) Inventors: Frederick L. Coan, Antioch, CA (US); Luis Brizuela, Antioch, CA (US)

(73) Assignee: Generon IGS, Inc., Houston, TX (US)

( * ) Notice: Subject to any disclaimer, the term of this patent is extended or adjusted under 35 U.S.C. 154(b) by 398 days.

(21) Appl. No.: 11/775,390

(22) Filed: Jul. 10, 2007

(65) Prior Publication Data

US 2008/0035270 A1    Feb. 14, 2008

Related U.S. Application Data

(60) Provisional application No. 60/822,269, filed on Aug. 14, 2006.

(51) Int. Cl.
| | |
|---|---|
| B29C 45/00 | (2006.01) |
| B29C 47/00 | (2006.01) |
| B32B 37/00 | (2006.01) |
| B29C 43/02 | (2006.01) |
| B29C 49/00 | (2006.01) |
| B29C 51/00 | (2006.01) |
| B29D 29/00 | (2006.01) |
| B29D 24/00 | (2006.01) |
| B29B 15/00 | (2006.01) |
| B29C 39/14 | (2006.01) |
| B29C 49/08 | (2006.01) |
| B29C 55/00 | (2006.01) |
| B29C 67/20 | (2006.01) |
| B29D 7/00 | (2006.01) |
| B29C 43/10 | (2006.01) |

(52) U.S. Cl. .......... 264/511; 264/553; 264/566; 264/568; 264/571; 264/101; 264/4.3; 264/46.8; 264/271.1; 264/279; 264/272.15; 264/274

(58) Field of Classification Search ........ 264/511, 264/553, 566, 568, 571, 101, 4.3, 46.8, 271.1, 264/279, 272.15, 274

See application file for complete search history.

(56) References Cited

U.S. PATENT DOCUMENTS

| | | | | |
|---|---|---|---|---|
| 4,248,648 | A | * | 2/1981 | Kopp ............ 156/94 |
| 5,192,478 | A | * | 3/1993 | Caskey ............ 264/139 |
| 6,766,817 | B2 | | 7/2004 | da Silva |
| 6,918,404 | B2 | | 7/2005 | da Silva |
| 7,066,586 | B2 | | 6/2006 | da Silva |
| 7,285,255 | B2 | | 10/2007 | Kadlec |
| 2005/0082716 | A1 | * | 4/2005 | Barefield et al. ...... 264/261 |
| 2006/0266217 | A1 | | 11/2006 | Jensvold |

* cited by examiner

*Primary Examiner*—Khanh Nguyen
*Assistant Examiner*—Matthew Hoover
(74) *Attorney, Agent, or Firm*—William H. Eilberg

(57) ABSTRACT

A tubesheet is formed at the end of a module containing polymeric material for gas separation, by immersing the end of the module in an epoxy material, or its equivalent. A vacuum, or partial vacuum, applied at or near the opposite end of the module, tends to draw the epoxy material towards the source of the vacuum, and results in a tubesheet having a desired thickness, even though the epoxy material may have relatively high viscosity. The method produces effective tubesheets, while minimizing the degree to which the tubesheet covers the otherwise useful surface area of the polymeric material. The method thus produces gas-separation modules having enhanced productivity.

17 Claims, 1 Drawing Sheet

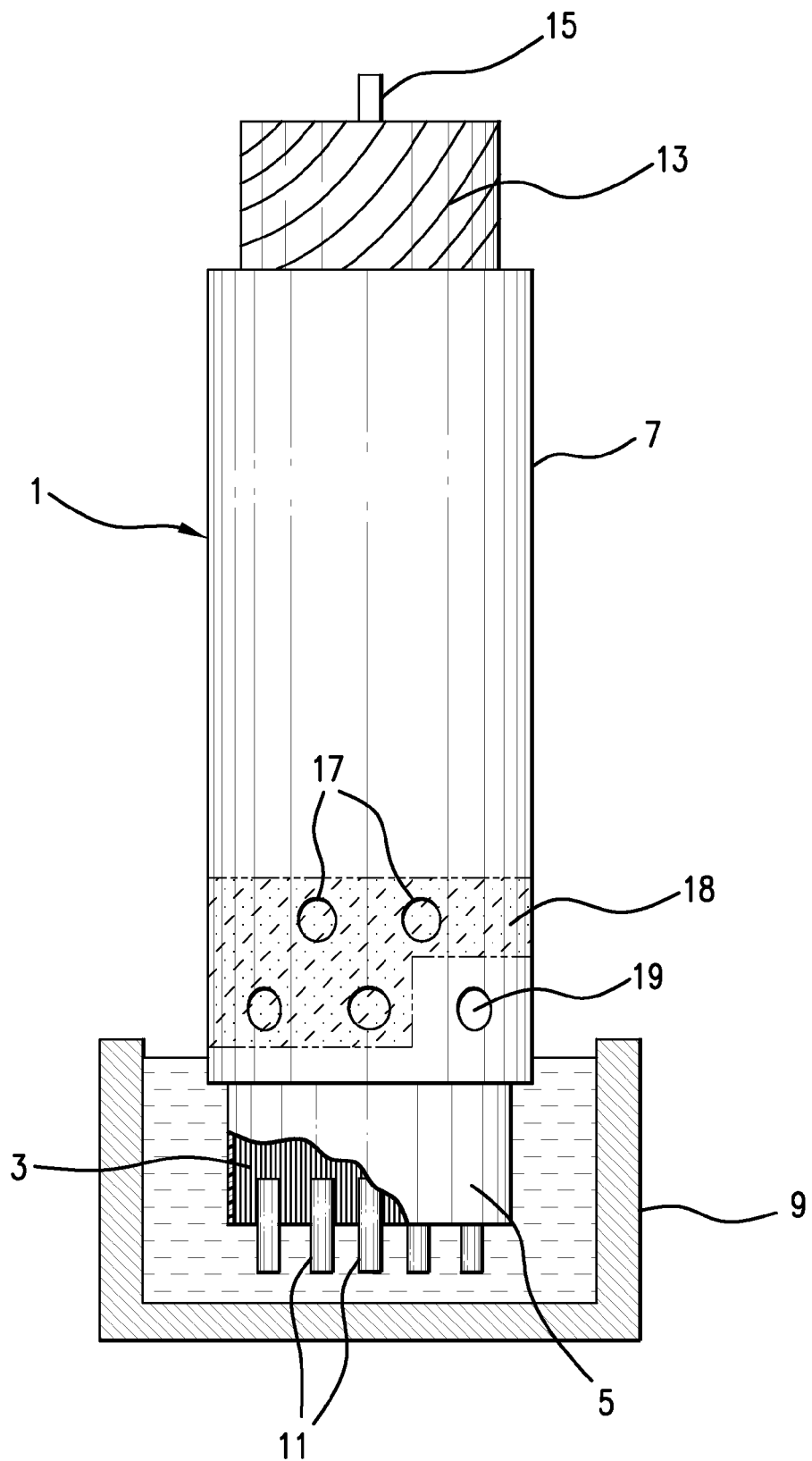

VACUUM-ASSISTED POTTING OF FIBER MODULE TUBESHEETS

CROSS-REFERENCE TO PRIOR APPLICATION

Priority is claimed from U.S. provisional patent application Ser. No. 60/822,269, filed Aug. 14, 2006, the disclosure of which is incorporated by reference herein.

BACKGROUND OF THE INVENTION

This invention relates to the manufacture of modules for non-cryogenic separation of gases into components. In particular, this invention provides an improved method of manufacturing a module containing a bundle of polymeric fiber membranes. More specifically, the present invention concerns the formation of tubesheets at both ends of the gas-separation module.

It has been known to use a polymeric membrane to separate air into components. Various polymers have the property that they allow different gases to flow through, or permeate, the membrane, at different rates. A polymer used in air separation, for example, will pass oxygen and nitrogen at different rates. The gas that preferentially flows through the membrane wall is called the "permeate" gas, and the gas that tends not to flow through the membrane is called the "non-permeate" gas. The selectivity of the membrane is a measure of the degree to which the membrane allows one component, but not the other, to pass through.

A membrane-based gas separation system has the inherent advantage that the system does not require the transportation, storage, and handling of cryogenic liquids. Also, a membrane system requires relatively little energy. The membrane itself has no moving parts; the only moving part in the overall membrane system is usually the compressor which provides the gas to be fed to the membrane.

A gas separation membrane unit is typically provided in the form of a module containing a large number of small, hollow fibers made of the selected polymeric membrane material. The module is generally cylindrical, and terminates in a pair of tubesheets which anchor the hollow fibers. The tubesheets are impervious to gas. The fibers are mounted so as to extend through the tubesheets, so that gas flowing through the interior of the fibers (known in the art as the bore side) can effectively bypass the tubesheets. But gas flowing in the region external to the fibers (known as the shell side) cannot pass through the tubesheets.

In operation, a gas is introduced into a membrane module, the gas being directed to flow through the bore side of the fibers. One component of the gas permeates through the fiber walls, and emerges on the shell side of the fibers, while the other, non-permeate, component tends to flow straight through the bores of the fibers. The non-permeate component comprises a product stream that emerges from the bore sides of the fibers at the outlet end of the module.

Examples of fiber membrane modules are given in U.S. patent application Ser. No. 11/137,827, filed May 25, 2005, published under Publication No. 2006-0266217 on Nov. 30, 2006, and U.S. patent application Ser. No. 11/383,301, filed May 15, 2006, the disclosures of both of which are hereby incorporated by reference.

A tubesheet is typically formed over the ends of a bundle of fibers by immersing an end of the bundle in an epoxy, or similar substance. When the epoxy cures, it forms a hard, solid structure which encases the ends of the fibers. This solid structure defines the tubesheet.

In practice, it is desired that the tubesheet be thick enough to anchor the fibers, but not so thick that it occupies too much of the surfaces of the fibers. If the tubesheet covers too much of the surface of the fiber, the utility of the fiber as a gas-separation membrane is impaired, because gas cannot flow through the covered portion. One way of making the tubesheet thicker is to use an epoxy material of relatively low viscosity, so that the material will more readily flow. But if the viscosity is too low, the material may "wick" along the fiber, eventually covering large parts of the fiber and effectively rendering part of the fiber useless. On the other hand, if one uses epoxy mixtures having higher viscosity, the wicking problem is overcome, but it then becomes difficult to obtain a tubesheet of the desired thickness.

The present invention provides a method for making a tubesheet, wherein the tubesheet can be conveniently formed with a relatively high-viscosity material.

SUMMARY OF THE INVENTION

The invention includes a method of forming a tubesheet over an end of a bundle of hollow fibers. The method comprises immersing an end of the fiber bundle in a sealant material, such as an epoxy, applying a vacuum, or partial vacuum, to the opposite end of the bundle, so as to draw the epoxy towards the source of the vacuum, and allowing the epoxy to harden and cure.

When the first tubesheet is formed, the vacuum is preferably applied through a flow tube attached to the end of the bundle which is opposite to the end at which the tubesheet is being formed. When the second tubesheet is formed, the location of the first tubesheet is, by definition, sealed, and the vacuum is therefore applied through a permeate flow hole, or other hole, in an outer casing surrounding the bundle.

Flow pins inserted in the temporarily sealed end of the fiber bundle allow the epoxy material to flow into the shell-side region of the fibers. A temporary overwrap is affixed to the bundle, during formation of the first tubesheet, to preserve the vacuum.

The process is performed twice, so as to form a tubesheet on each of the ends of the module. When the tubesheets have been formed and cured, portions of each end are cut off, removing the temporary structures (seals and flow pins) and re-opening the ends of the fibers.

The process can also be practiced with modules having alternative structures, such as modules formed by winding a pair of polymeric sheets into a spiral. In such modules, tubesheets are still necessary to anchor and seal the spiral channels.

The present invention therefore has a primary object of providing a method for making a gas-separation module comprising a bundle of hollow fibers.

The invention has the further object of providing a method for making a tubesheet formed at an end of a fiber bundle.

The invention has the further object of providing a method for making a tubesheet formed at an end of a module containing a polymeric membrane for gas separation.

The invention has the further object of making it feasible to form tubesheets from epoxy materials, or other materials, having relatively high viscosity.

The invention has the further object of providing a method for making a tubesheet, wherein the method preserves the amount of useful surface area of the fibers attached to the tubesheet, and which therefore produces a gas-separation module having enhanced productivity.

The invention has the further object of reducing the cost, and improving the efficiency, of the non-cryogenic separation of air, or other gases, into components.

The reader skilled in the art will recognize other objects and advantages of the present invention, from a reading of the following brief description of the drawing, the detailed description of the invention, and the appended claims.

BRIEF DESCRIPTION OF THE DRAWING

The FIG. provides a diagram, in an elevational view, partly schematic and partly broken away, showing the manufacture of a tubesheet according to the present invention.

DETAILED DESCRIPTION OF THE INVENTION

The FIG. shows the formation of a tubesheet by immersing an end of a fiber membrane bundle into a mold or potting stand, or other vessel, the mold containing an epoxy mixture or its equivalent. As used in this specification, the formation of a solid tubesheet, over the ends of a bundle of fibers, is called "potting". Potting is therefore the casting of an epoxy, or its equivalent, to form a tubesheet for the fiber bundle.

A critical step in the potting process of the present invention includes providing a partial vacuum within the module, so as to draw the epoxy mixture upward. The partial vacuum thus enables the tubesheet to be formed of a desired thickness. But, by using a high-viscosity epoxy, the thickness of the tubesheet will still be limited, and will not cover an unduly large portion of the surface area of the fibers. That is, the degree of wicking of the epoxy is limited.

The fiber membrane module 1 includes a bundle of hollow fibers 3, some of which are visible in a broken-away portion of the FIG.. The fibers are arranged in a bundle which is enclosed by an elastic outer sock 5. The sock encloses the entire bundle of fibers. The entire module, including the sock, is held within casing 7, which may be made of polyvinyl chloride, or other material.

As shown in the FIG., the module 1 is inserted, vertically, into potting stand or mold 9, such that one end of the module is within the mold. An epoxy mixture, or its equivalent, is pumped into the mold and allowed to reach the required viscosity. This viscosity can be in the range of about 500-3000 cP, depending upon the bundle type and the epoxy composition. At the appropriate time, the bundle is lowered into the mold until the epoxy mixture covers the exposed fiber bundle. That is, the end of the module is immersed within the epoxy. In this specification, the term "epoxy" should be interpreted to include other sealants or adhesives or other equivalent materials.

It should be noted that, when the fiber bundle is formed, and before the tubesheets are applied, the ends of the bundle are temporarily sealed with a glue. Typically, a hot melt glue is used, and the end of the bundle is either dipped into the glue, or the glue is sprayed onto the end of the bundle. The glue forms what is effectively a temporary tubesheet, which is much thinner than a permanent tubesheet, of the order of $1/16$ inch.

To enable the epoxy to penetrate the regions between the fibers, flow pins 11 are inserted through the sealed end, as shown. The flow pins are preferably hollow plastic tubes, through which epoxy can be introduced. Also, the epoxy can penetrate the shell-side region of the fibers, by entering from the side of the module, i.e. from a position displaced from the end of the module.

In a preferred embodiment, the epoxy mixture has a viscosity in the area of about 500-3000 cP. The invention is not limited to this range, however.

A sealing plastic overwrap 13 is placed around the fiber bundle, at the end opposite from that being potted. The overwrap is a temporary structure, used only at the end of the module which is opposite to the end being potted. The purpose of the overwrap is to preserve a partial vacuum to be created within the module. The overwrap surrounds the elastic outer sock which encloses the fiber bundle. A flow tube 15 is inserted through the sealed top end of the module, as shown. A partial vacuum source is provided through the flow tube. In a preferred embodiment, the pressure provided is of the order of about 10-15 inches Hg.

A vacuum, or partial vacuum, can be applied as soon as the end of the fiber bundle contacts the epoxy mixture, or the application of the vacuum can be delayed until the end of the bundle is fully covered. The vacuum or partial vacuum causes the epoxy in the mold to move slightly upward, by a desired distance. The actual distance is determined by the amount of suction provided. In general, this distance may be of the order of two inches or more, and, in any event, is greater than the thickness of the temporary seal. A vacuum in the range of 10-15 inches Hg has been found to be the optimum for the bundle types and epoxy mixtures currently in use. But the invention is not limited by this range of vacuum. Values outside of the above range could also be used, with other bundle types and/or epoxy mixtures. The vacuum is maintained until the bundle reaches its final insertion level, at which time the vacuum is removed to prevent excess epoxy uptake into the bundle. The epoxy is then allowed to cure fully, to become a hard and solid material.

To form the other tubesheet, it is necessary to invert the module, so that the opposite end is immersed in the epoxy. However, because of the epoxy that has been formed at the first end, it is no longer feasible to provide a flow tube, similar to flow tube 15, because doing so would require punching a hole in the newly formed tubesheet. Instead, the vacuum can be applied through one or more of permeate gas flow holes 17, which, when the module is inverted relative to the position shown in the FIG., will be located near the top of the module. The same amount of suction (10-15 inches Hg) is preferably applied. The applied suction has the same effect as before, namely to draw the epoxy upward, so that it forms a tubesheet of the desired thickness.

When the vacuum is to be applied through a permeate gas flow hole, it is preferable to affix a barrier, such as a tape or wrapping 18, to block off all but one of the permeate gas holes. In the example given in the FIG., the vacuum is applied through hole 19, while the other holes are temporarily blocked.

Note also that when the second tubesheet is formed, it is no longer necessary to provide an overwrap at the opposite end of the module, because the first tubesheet already forms the necessary seal.

After both tubesheets have been formed, and the epoxy at both ends has dried and cured, about one inch at each end of the module is cut off. The latter operation removes the flow pins, and, by sacrificing about one inch of the length of the module, re-opens the fibers, which were temporarily closed off by the glue, and which can now be connected to an appropriate conduit.

Thus, the present invention comprises a process which uses a vacuum, or partial vacuum, to aid in the penetration of an epoxy mixture, or its equivalent, into a module bundle to form a defect-free tubesheet. This technique allows the use of higher viscosity epoxy mixtures to reduce wicking of the epoxy mixture up into the bundle of fibers. By reducing the likelihood of wicking, the present invention maximizes the available surface area of the fibers, and therefore produces a module having enhanced productivity.

The present invention can be practiced with a standard module comprising a bundle of hollow fibers. Any permeate exit holes in the outside casing are sealed with tape to prevent air intrusion upon application of the vacuum. When a vacuum is to be applied to the outside casing, one of the permeate holes is left open to allow attachment of a vacuum hose. When a vacuum is to be applied to the bundle, a flow pin is inserted into the non-potted end to allow attachment of a vacuum hose.

The embodiment described above comprises a module having a plurality of fibers arranged in a bundle and enclosed within a generally cylindrical casing. The present invention can also be used with the following alternative embodiment.

In this alternative construction, the module comprises flat sheets of polymeric material instead of fibers. A pair of flat sheets are wound together to form a spiral. The spiral wound structure is enclosed in a generally cylindrical casing. Due to the spiral winding, the interior of the structure defines two distinct channels. Gas to be separated can be supplied, at an elevated pressure, into one of the spiral channels. Some of this gas permeates through the wall separating the channels, and this permeate gas can be recovered from the other channel.

As in the first embodiment, the ends of the spiral structure must still be sealed. The sealing can be done by forming tubesheets in the same manner described above. That is, the ends of the spiral wound structure are dipped in an epoxy material, and the epoxy travels upward, under the influence of an applied vacuum. The epoxy hardens, and forms a tubesheet encasing the end of the structure. Flow pins can be used, as described above, for directing epoxy material into spaces between the polymeric sheets. The final product differs from that of the previous embodiment only in that the tubesheet encases the ends of the pairs of flat polymeric sheets, instead of encasing a plurality of tiny hollow fibers. The invention is otherwise the same for both forms of the module.

The present invention is intended to include both of the above-described embodiments.

The invention can be modified in other ways, which will be apparent to those skilled in the art. Such modifications should be considered within the spirit and scope of the following claims.

What is claimed is:

1. A method of forming a tubesheet over an end of a bundle of hollow fibers, comprising:
   a) immersing an end of a fiber bundle in a sealant material,
   b) applying at least a partial vacuum in an interior region of the bundle, so as to draw the sealant material towards a source of the vacuum, and
   c) allowing the sealant material to harden,
   wherein step (b) includes applying at least a partial vacuum through a permeate gas flow hole formed in a casing surrounding the bundle.

2. The method of claim 1, wherein step (b) includes applying at least a partial vacuum through a flow tube attached to an opposite end of the bundle.

3. The method of claim 1, wherein step (a) comprises causing the sealant to flow through at least one flow pin inserted into the end of the bundle which has been immersed in the sealant.

4. The method of claim 1, wherein step (b) includes covering a portion of the bundle with a temporary overwrap to preserve the at least partial vacuum.

5. The method of claim 1, wherein the bundle has two ends, and wherein the method is performed twice, one time for each end of the bundle.

6. A method of forming a tubesheet at an end of a bundle of hollow fibers, the bundle being held within an enclosure, the method comprising immersing an end of the bundle in a flowable sealant material, and applying at least a partial vacuum to an interior region of the enclosure, so as to draw at least some of the sealant material towards a source of the vacuum, wherein the sealant material, when hardened, comprises a tubesheet surrounding ends of the fibers,
   wherein the enclosure includes at least one permeate gas flow hole, and wherein the vacuum applying step comprises applying the vacuum through the permeate gas flow hole.

7. The method of claim 6, wherein the immersing step is preceded by inserting at least one flow pin into the end of the bundle, the flow pin comprising a conduit for allowing the sealant to flow into a region between the fibers.

8. The method of claim 7, further comprising allowing the sealant to harden, and cutting a portion of the bundle so as to expose the fibers encased within the hardened sealant.

9. The method of claim 6, wherein the vacuum applying step comprises applying the vacuum from a second end of the bundle, the second end being opposite to the end at which the tubesheet is formed.

10. A method of forming a tubesheet at an end of a bundle of hollow fibers, the bundle being held within an enclosure, the method comprising immersing an end of the bundle in a flowable sealant material, and applying at least a partial vacuum to an interior region of the enclosure, so as to draw at least some of the sealant material towards a source of the vacuum, wherein the sealant material, when hardened, comprises a tubesheet surrounding ends of the fibers, wherein the enclosure includes a plurality of permeate gas flow holes, and wherein the vacuum applying step comprises temporarily covering at least some of said flow holes, and applying the vacuum through an exposed flow hole.

11. The method of claim 6, wherein the bundle has two ends, and wherein the method is performed once for each end, so as to form tubesheets at both ends of the bundle.

12. A method of forming a tubesheet at an end of a module containing polymeric material, the module including an enclosure surrounding the polymeric material, the method comprising immersing an end of the module in a flowable sealant material, and applying at least a partial vacuum to an interior region of the enclosure, so as to draw at least some of the sealant material towards a source of the vacuum, wherein the sealant material, when hardened, comprises a tubesheet for anchoring the polymeric material at said end of the module,
   wherein the enclosure includes at least one permeate gas flow hole, and wherein the vacuum applying step comprises applying the vacuum through the permeate gas flow hole.

13. The method of claim 12, wherein the immersing step is preceded by inserting at least one flow pin into the end of the module, the flow pin comprising a conduit for allowing the sealant to flow into the module.

14. The method of claim 13, further comprising allowing the sealant to harden, and cutting a portion of the module so as to expose the polymeric material encased within the hardened sealant.

15. The method of claim 12, wherein the vacuum applying step comprises applying the vacuum from a second end of the module, the second end being opposite to the end at which the tubesheet is formed.

16. A method of forming a tubesheet at an end of a module containing polymeric material, the module including an enclosure surrounding the polymeric material, the method comprising immersing an end of the module in a flowable sealant material, and applying at least a partial vacuum to an interior region of the enclosure, so as to draw at least some of the sealant material towards a source of the vacuum, wherein the sealant material, when hardened, comprises a tubesheet for anchoring the polymeric material at said end of the module, wherein the enclosure includes a plurality of permeate gas flow holes, and wherein the vacuum applying step comprises temporarily covering at least some of said flow holes, and applying the vacuum through an exposed flow hole.

17. The method of claim 12, wherein the module has two ends, and wherein the method is performed once for each end, so as to form tubesheets at both ends of the module.

* * * * *